US008130929B2

(12) United States Patent
Wilkes et al.

(10) Patent No.: US 8,130,929 B2
(45) Date of Patent: Mar. 6, 2012

(54) METHODS FOR OBTAINING COMPLEX DATA IN AN INTERACTIVE VOICE RESPONSE SYSTEM

(75) Inventors: T. Clay Wilkes, North Salt Lake, UT (US); Richard T. Newton, Syracuse, UT (US)

(73) Assignee: Galileo Processing, Inc., Salt Lake City, UT (US)

( * ) Notice: Subject to any disclaimer, the term of this patent is extended or adjusted under 35 U.S.C. 154(b) by 1080 days.

(21) Appl. No.: 11/137,959

(22) Filed: May 25, 2005

(65) Prior Publication Data
US 2005/0267748 A1 Dec. 1, 2005

Related U.S. Application Data

(60) Provisional application No. 60/574,029, filed on May 25, 2004.

(51) Int. Cl.
*H04M 3/42* (2006.01)
(52) U.S. Cl. ............... 379/201.12; 370/352; 379/88.04; 379/88.25; 379/201.01; 379/265.01; 455/412.1; 455/415; 704/270; 709/201; 709/219
(58) Field of Classification Search ............... 379/91.01, 379/91.02, 93.12, 93.13, 114.05, 114.1, 114.2, 379/67.1–88.28, 201.01–332; 348/14.01–14.16; 455/418–420, 412.1–417; 704/270–278; 705/3, 28, 35; 707/602, 607, 609–615, 617, 707/694, 736, 741, 754–756, 770, 776; 709/201–207, 217–244; 370/259–271, 351–356
See application file for complete search history.

(56) References Cited

U.S. PATENT DOCUMENTS

| | | | | |
|---|---|---|---|---|
| 5,127,043 A * | 6/1992 | Hunt et al. | ................. | 379/88.02 |
| 5,204,894 A * | 4/1993 | Darden | ...................... | 379/88.03 |
| 5,369,685 A * | 11/1994 | Kero | ........................... | 379/88.04 |
| 5,497,414 A * | 3/1996 | Bartholomew | .......... | 379/142.02 |
| 5,638,425 A * | 6/1997 | Meador et al. | ............. | 379/88.01 |
| 5,659,597 A * | 8/1997 | Bareis et al. | .................. | 455/563 |
| 5,825,856 A * | 10/1998 | Porter et al. | ............... | 379/93.12 |
| 5,835,570 A * | 11/1998 | Wattenbarger | ............. | 379/88.03 |
| 5,873,032 A * | 2/1999 | Cox et al. | ....................... | 455/417 |
| 5,892,820 A * | 4/1999 | Armstrong et al. | ...... | 379/213.01 |
| 5,915,001 A * | 6/1999 | Uppaluru | ................... | 379/88.22 |
| 6,052,439 A * | 4/2000 | Gerszberg et al. | ......... | 379/88.01 |
| 6,236,967 B1 * | 5/2001 | Brotman et al. | .............. | 704/270 |

(Continued)

FOREIGN PATENT DOCUMENTS
EP    0757868    9/1999

*Primary Examiner* — Hemant Patel
(74) *Attorney, Agent, or Firm* — Maschoff Gilmore & Israelsen

(57) ABSTRACT

Methods and systems using voice recognition can obtain complex data from a database using simple data obtained from a user. The database associates and stores complex data with simple data. The interactive voice response system prompts the user for simple information, such as a phone number, which can be interpreted using voice recognition. The speech-obtained simple data is then matched with the simple data stored in the database. If a match is found, the complex data (e.g., a street address) stored with the simple data is communicated to the IVR system. The IVR system communicates the complex data to the user and prompts the user to confirm whether the complex data is accurate. The database can be a third-party database such as a computer accessible phone directory or a credit bureau.

15 Claims, 3 Drawing Sheets

U.S. PATENT DOCUMENTS

| | | | |
|---|---|---|---|
| 6,246,988 B1 * | 6/2001 | Schier | 704/273 |
| 6,335,928 B1 * | 1/2002 | Herrmann et al. | 370/352 |
| 6,418,328 B1 * | 7/2002 | Shon | 455/563 |
| 6,430,175 B1 * | 8/2002 | Echols et al. | 370/352 |
| 6,598,016 B1 | 7/2003 | Zavoli et al. | |
| 6,650,738 B1 * | 11/2003 | Pershan et al. | 379/88.03 |
| 6,680,999 B1 * | 1/2004 | Garcia | 379/88.22 |
| 6,748,426 B1 * | 6/2004 | Shaffer et al. | 709/219 |
| 6,792,096 B2 * | 9/2004 | Martin et al. | 379/218.01 |
| 6,795,537 B1 * | 9/2004 | Gilbert | 379/93.25 |
| 6,847,717 B1 * | 1/2005 | Bossemeyer, Jr. | 379/355.01 |
| 6,907,119 B2 * | 6/2005 | Case et al. | 379/218.01 |
| 6,996,531 B2 * | 2/2006 | Korall et al. | 704/270 |
| 7,013,001 B1 * | 3/2006 | Felger et al. | 379/115.02 |
| 7,031,438 B1 * | 4/2006 | Cheston et al. | 379/88.14 |
| 7,212,629 B2 * | 5/2007 | Lennon et | 379/447 |
| 7,242,758 B2 * | 7/2007 | Mane et al. | 379/218.01 |
| 7,269,563 B2 * | 9/2007 | Douros | 704/275 |
| 2001/0011225 A1 * | 8/2001 | O'Connor et al. | 705/9 |
| 2002/0019737 A1 * | 2/2002 | Stuart et al. | 704/275 |
| 2002/0141561 A1 * | 10/2002 | Duncan et al. | 379/220.01 |
| 2003/0004820 A1 | 1/2003 | Clifton et al. | |
| 2003/0059000 A1 * | 3/2003 | Burton et al. | 379/67.1 |
| 2003/0221125 A1 | 11/2003 | Rolfe | |
| 2003/0236740 A1 * | 12/2003 | Lang et al. | 705/38 |
| 2004/0015365 A1 * | 1/2004 | Ohmori et al. | 704/276 |
| 2004/0029567 A1 * | 2/2004 | Timmins et al. | 455/412.1 |
| 2004/0184593 A1 * | 9/2004 | Elsey et al. | 379/218.01 |
| 2006/0093120 A1 * | 5/2006 | Thorpe et al. | 379/218.01 |

* cited by examiner

METHODS FOR OBTAINING COMPLEX DATA IN AN INTERACTIVE VOICE RESPONSE SYSTEM

CROSS-REFERENCE TO RELATED APPLICATIONS

This application claims the benefit of U.S. Provisional Application Ser. No. 60/574,029, filed May 25, 2004, entitled "Speech Recognition System For Complex Information and Confirmation," which is incorporated herein by reference.

BACKGROUND OF THE INVENTION

1. The Field of the Invention

The present invention relates to speech recognition systems. More specifically, the present invention relates to interactive voice response systems that can access a database to obtain complex information to reduce the amount of incoming voice-transmitted data needed to complete a transaction.

2. Related Technology

Speech recognition technologies have been used for years in interactive voice response (IVR) systems that permit customers or other users to access information or initiate transactions over the telephone. In this manner, telephone users can navigate through a series of menu selections or can provide data without talking to a human telephone operator or customer service representative. This reduces the cost of transactions and services, thereby providing benefit to the customers as well as the operators of the IVR systems.

One problem with IVR systems is that they must be programmed to interpret certain types of data. It is known in the art of voice recognition systems that it is easier and more reliable to interpret incoming voice data when the content of the voice data is expected to consist of a finite or relatively small set of words as opposed to being open-ended. For example, it is significantly easier to interpret an incoming voice command that is expected to consist only of numbers or of states of the United States compared to voice data that might consist of names or, particularly of street addresses. Thus, it is difficult for IVR systems to reliably receive incoming address or contact information when such information includes street addresses.

Consequently, when street addresses or other similarly complex or open-ended information is to be gathered, the conventional solution has been to use human telephone operators or online web interfaces. However, paying a human operator is expensive and online web interfaces are not readily accessible to many people.

A partial remedy to the problem has been to first establish an account using a human operator or an online web interface. An IVR system can then access information about the known user through the user's account number. While such a system can provide accurate complex data for a known user, the system still requires human operators or an online web interface to establish the account.

Another problem with existing IVR systems is the expense that is incurred to customize the IVR for particular information. Existing IVR systems are configured to receive particular types of information. Purchasers of these systems must either limit the information that they can collect and use or they must pay to have the system configured to interpret the specific data that they need. If after configuring the system the purchaser decides to collect a different type of data, the purchaser will incur significant expenses to update the speech recognition software.

Therefore, what is needed is an IVR system that can reliably obtain complex information and that can be more easily customized to obtain different types of information.

SUMMARY OF THE INVENTION

The present invention relates to systems and methods for combining speech recognition in interactive voice response (IVR) systems with other sources of data to enable complex information (e.g., contact information or addresses) to be reliably obtained. Relatively complex data that that cannot be easily interpreted by voice recognition systems is obtained from sources other than incoming voice data. An IVR system obtains complex data by first obtaining simple data from the user, which can then be used to extract the complex data. The user can also be prompted to verify that the information obtained by the IVR is accurate. By using simple data obtained from the user to access complex data in the database, the IVR can complete a transaction or perform a similar task using less complicated speech data than would otherwise be necessary.

The methods of the present invention can be performed using various types of simple data and complex data. The present invention is particularly useful for obtaining a user's address or similarly complex data. In an exemplary embodiment, a first step of the invention includes using the IVR system to obtain identifying information from the user that is simple for the IVR system to interpret. In particular, the IVR obtains voice data that corresponds to a name or telephone number. The obtained name or telephone number is then used to access an address database that links street addresses with names or telephone numbers. The address database can be a proprietary database or any of a variety of widely-available databases that include address information such as the city, state, zip code and street addresses associated with specific telephone numbers or names.

Once a candidate street address has been obtained form the database, the IVR uses a text-to-voice system for speaking the candidate street address to the user and asks for confirmation thereof. If the candidate street address is confirmed as being correct, the IVR has successfully obtained a valid street address associated with the user. If the street address is incorrect, the IVR asks the user to verbally provide the street address, transfers the caller to a human operator, or asks the user to provide the address in some other way, such as through the Internet.

In this manner, the IVR system can obtain a full set of identifying information associated with a user without the difficulty of interpreting incoming voice data that contains street addresses or other complex information.

In one embodiment of the invention, the IVR system obtains complex information from a third-party database. For example, the IVR system can access phone directories on the World Wide Web or other databases that provide vast and relatively up-to-date information. Accessing these databases can significantly reduce or eliminate many of the costs associated with establishing and maintaining a database.

Moreover, by accessing a third-party database, the database can be selected such that it contains information about almost any person that may want to access the IVR system. For example, web based phone directories and credit bureaus maintain records of almost every person living and/or conducting transactions within a geographical area such as the United States. By using a comprehensive database such as these, the IVR system can obtain complex data about a person that has no prior contact with the IVR system. This feature of the invention allows the IVR system to establish accounts or perform other transactions with first time users.

Another advantage of the method of the present invention arises from the ability to collect complex information without interpreting complex voice data. Because speech recognition software is complex and difficult to code, the ability to collect complex data without modifying the speech recognition software provides significant flexibility for modifying or updating the IVR system.

These and other advantages and features of the present invention will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Figure 1:
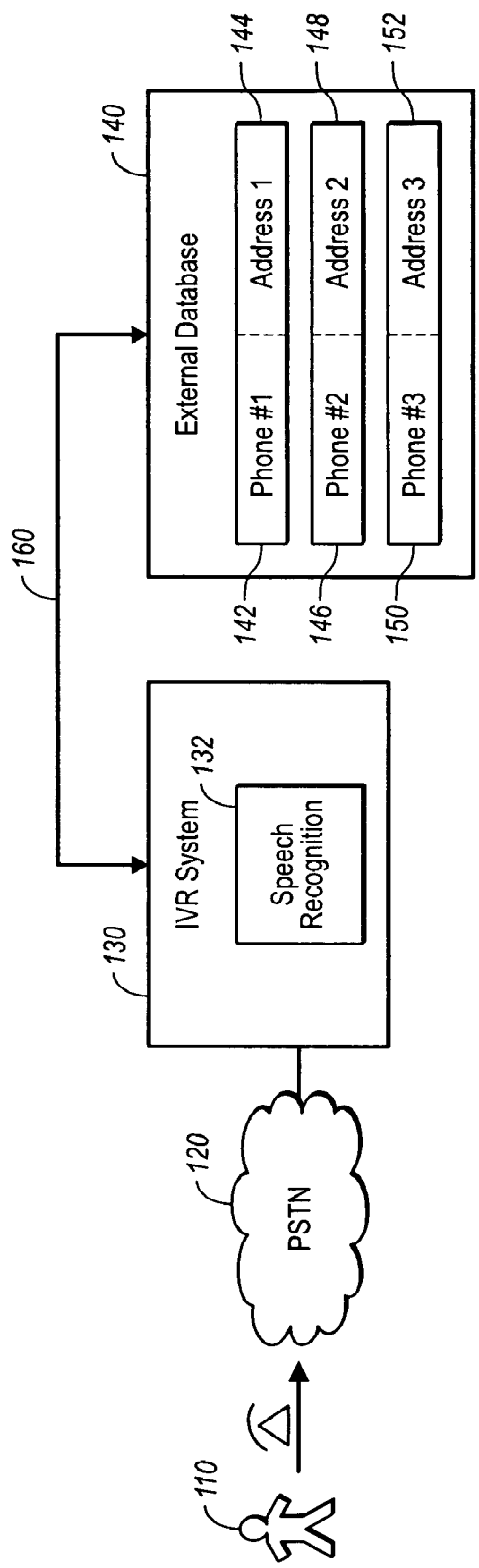
FIG. 1 a block diagram illustrating an exemplary system for collecting complex data from a database using the methods of the present invention.

The present invention is directed to methods for obtaining complex data in an IVR system. Information obtained from the user is used to access complex data in a database. Once the complex data is obtained, the IVR system can communicate the complex data to the user so that the user can verify that the complex data is accurate. For example, where a street address is obtained from a database, the IVR can confirm that the correct street address has been obtained. In an exemplary embodiment, the IVR accesses a third-party database such as a credit bureau using a highly unique data, such as a social security number. The methods of the present invention facilitate accurate transactions in an IVR system to enable transactions that could not otherwise be performed or would be highly prone to errors.

For purposes of the present invention, the terms "simple data element," "simple data", and "simple information" are substantially interchangeable and refer to a data element that an IVR is capable of obtaining via voice data, or data having a relatively small number of possible values, or data having a fixed format.

For purposes of the present invention, the terms "complex data element," "complex data," and "complex information" are substantially interchangeable and refer to a data element that an IVR is not capable of obtaining via voice data, or a data element that if obtained by the IVR via voice data is prone to be in error, or data having a relatively high number of possible values, or data having format that is not substantially fixed. The use of the term "complex" does not mean that the data element necessarily has any specific level of complexity; rather, the use of "complex" simply indicates that the data element is more difficult to obtain via speech data than is the simple data element.

Whether a particular type of data is difficult to obtain depends in part on the nature of the data and in part on the configuration of the speech recognition software. In a typical system, a non-limiting example of a complex data element is a person's street address as compared to a person's telephone number. However, for an IVR system that is not configured to interpret telephone numbers, a telephone number can be a complex data element. For example, in a system that is configured to interpret social security numbers, but not telephone numbers, a telephone number is a complex data element as compared to the social security number. In general, the terms "simple data" and "complex data" can be interpreted relative to one another in the sense that if a first class of data is simpler than a second class of data, the first class of data can be referred to as being "simple data" and the second class of data can be referred to as being "complex data."

For purposes of the present invention, the term third-party database includes databases that are generally available to the public for free or for a fee. Phone directories on the World Wide Web and data available from credit bureaus such as TransUnion are non-limiting examples of third-party databases.

I. System Configuration

The systems of the present invention generally includes (i) a communications network, (ii) an IVR system, and (iii) a database for storing simple and complex data. FIG. 1, is a schematic illustrating an exemplary system according to the present invention. In the embodiment shown in FIG. 1, a user 110 accesses the public switched telephone network (PSTN) 120 using a telephone. The IVR system 130 is configured to receive voice data from user 110 over network 120. IVR system 130 also includes speech recognition software 132 for interpreting the voice data. The IVR system also has access to database 140 through communications link 160.

Any communications network can be used in the system of the present invention to provide a voice link between a user and the IVR system so long as the communications network is capable of transmitting voice data. As illustrated in FIG. 1, a public switched telephone network can be used. Alternatively voice data can be transmitted over the Internet or other systems using protocols known in the art.

The IVR system 130 typically includes one or more computers or servers that are networked to PSTN 120 or a similar network. IVR 130 is generally part of a computing environment as described in Section III, below. IVR 130 has speech recognition capabilities 132 for interpreting voice data received from user 110. Those skilled in the art are familiar with speech recognition software that can interpret voice data. The speech recognition software is configured to interpret voice data that can then be used to extract complex data from database 140.

IVR system 130 is also networked to external database 140 through communications link 160. Communications link 160 can be any link suitable for transferring data. An example of a suitable link is an internet connection to the World Wide Web. External database 140 is typically part of an external network such as a server. The methods of the present invention can be carried out on proprietary databases or databases that are not external to the IVR system. However, as mentioned it can be advantageous to use a third-party database since it avoids the expense of maintaining the database and third-party databases often have information on vast numbers of people. Computer-accessible phone directories and credit bureaus, which are available on the World Wide Web, are particularly useful third-party databases since they are readily accessible and very comprehensive.

Database 140, whether part of a server or other computer system, is typically part of a computing environment, which is described in Section II below. In the example illustrated in FIG. 1, database 140 is a hard disk drive or other storage medium that can store a plurality of data sets. In one embodiment, database 140 stores a plurality of phone numbers 142, 146, and 150, which are linked to street addresses 144, 148, and 152, respectively.

Database 140 is a database used to store both simple data and complex data and provide a link between the two types of data. In FIG. 1, phone numbers 142, 146, and 150 are simple data elements and addresses 144, 148, and 152 are complex data elements. Addresses 144, 148, and 152 are linked to respective phone numbers 142, 146, and 150. In this embodiment, addresses 144, 148, and 152 are complex data elements because speech recognition software 132 is not capable of obtaining the addresses from voice data or if the addresses were obtained from voice data the addresses would likely have errors.

In the present invention, database 140 can have any number or types of simple and complex data. Examples of simple data elements include phone numbers, zip codes, account numbers, names, social security numbers, credit card numbers, or any other type of information that can be accurately obtained from speech data using speech recognition software. The simple data elements can also be combinations of data, including combinations of any of the foregoing.

Simple data elements are data such as names and telephone numbers that include constituent elements that are generally expected to be contained in a relatively small set of possible words. For example, telephone numbers generally include the digits zero through nine. This is in contrast to complex data such as street addresses, which are generally more difficult to interpret, especially when mixed with numeric input (e.g., 1247 NE Pisquaney #308).

The database can store any number or type of complex data so long as the data is capable of being transferred over a communications link. As mentioned, examples of complex data include street names and other data that is difficult to obtain via voice data. As discussed above, the complex data is not limited to a data element with any particular level of complexity. Whether a data element is complex depends on the sophistication of the speech recognition software. Thus, for one system, a phone number or social security number might be simple to interpret, but for another IVR the same data may be complex.

II. Method of Collecting Complex Data

Figure 2:
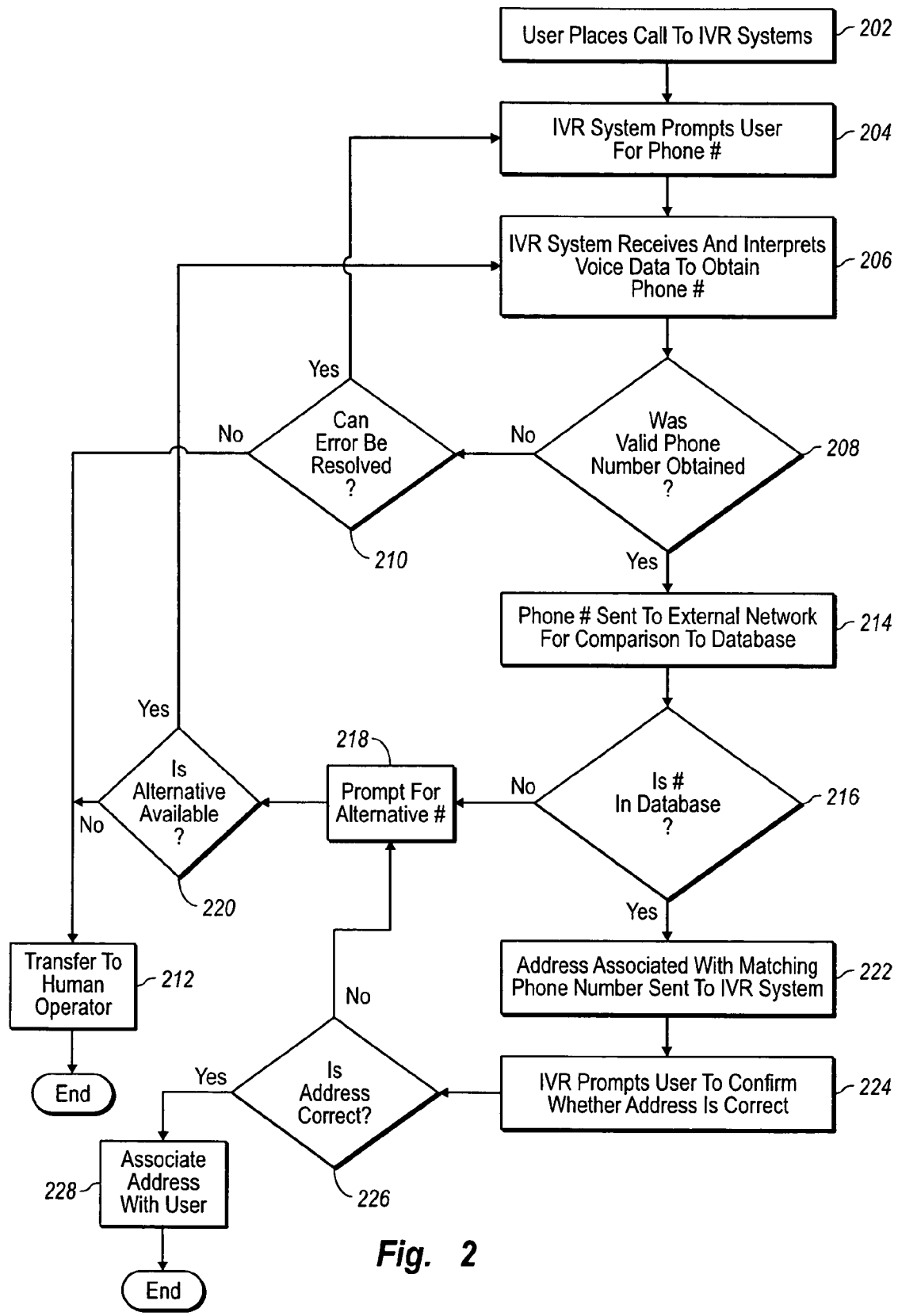
FIG. 2 is a flow diagram showing an exemplary method for obtaining complex data according to the present invention.

FIG. 2 provides a flow chart for obtaining complex data such as a person's street address using the method of the present invention. The following description provides a specific exemplary method for obtaining a street address of a user according to the methods of the present invention. However, as described above, the methods of the present invention are not limited to the collection of these particular data types.

In a first block 202, the user places a call to the IVR system. In block 204, the IVR system prompts user for a simple data element such as the user's phone number. In block 206, the IVR receives the voice data from the user and interprets the voice data to obtain the simple data (e.g., a phone number). In decision block 208 a decision is made as to whether a valid phone number has been obtained. This decision can be based on any one of several variables. For example, the number provided by the user can be analyzed to determine whether it has the correct amount of digits or whether the area code or other portion of the phone number is valid.

If the phone number is not valid, a decision is made in decision block 210 as to whether the error can be resolved. For example, if a seven digit number has been obtained, the user has likely omitted the area code, in which case, the IVR system may need to prompt the user for the complete phone number. If the error cannot be resolved by the IVR system, the user is transferred to a human operator in block 212. If the error can be resolved, block 204 is repeated and the user is prompted for a telephone number.

Once it is determined that a valid phone number has been obtained, the phone number is sent to an external network in block 214. The external network compares the phone number received from the IVR with the phone numbers (i.e., simple data elements) in the database. In decision block 216, it is determined whether the phone number received from the IVR system matches any of the phone numbers in the database. Any criteria can be used for determining a match. For example, simple data such as a phone numbers and social security numbers, determining a match typically require an exact match. In other embodiments of the invention where simple data elements are items such as names, the criteria for determining a match can allow for alternatives, such as alternative spellings, nicknames, middle names, etc.

If the phone number received from the IVR system does not match a number in the database, the IVR system prompts the user for an alternative phone number in block 218. If an alternative phone number is found to be available as determined in decision block 220, then the routine returns to block 206. If an alternative phone number is not available, the user is transferred to a human operator in block 212.

If in decision block 216 it is determined that the number is in the database, the address that is associated with the phone number is sent to the IVR system in block 222. Next the IVR system verifies the accuracy of the street address. Using a text-to-voice technology, in block 224, the street address is sent to the user and the user is prompted to confirm whether the address is accurate. The address may be inaccurate for any number of reasons, such as that the simple data was incorrectly matched with the simple data in the database or that the data associated with the simple data in the database is outdated or inaccurate. For example, the address presented to the user may be an old address or an alternative address. If the address is not correct, block 218 is performed and the user is prompted for an alternative number.

If in decision block 226 the user verifies that the street address is correct, the street address is associated with the particular user in block 228. In this manner, a street address can be obtained by the IVR system without having to interpret voice data that corresponds to the street address. This method allows users to carry out transactions on an IVR system without first establishing an account or other relationship with an institution via a human operator or web-based interface. Instead, users, including new users, can establish and complete a transaction over an IVR system even though complex information such as street address is needed for the transaction.

Those skilled in the art will recognize that there are many ways to handle errors and exceptions in the systems and methods of the present invention. For example, if the IVR system is not able to obtain simple information from the user, or if the database does not contain matching information, or if the information obtained is inaccurate, the user can be directed to any of a number of menus in the IVR system or transferred out of the IVR system to a human or web-based interface. Those skilled in the art are familiar with handling errors and exceptions in IVR systems.

III. Computing Environment

The embodiments of the present invention may include a special purpose or general-purpose computer including various computer hardware as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 3:
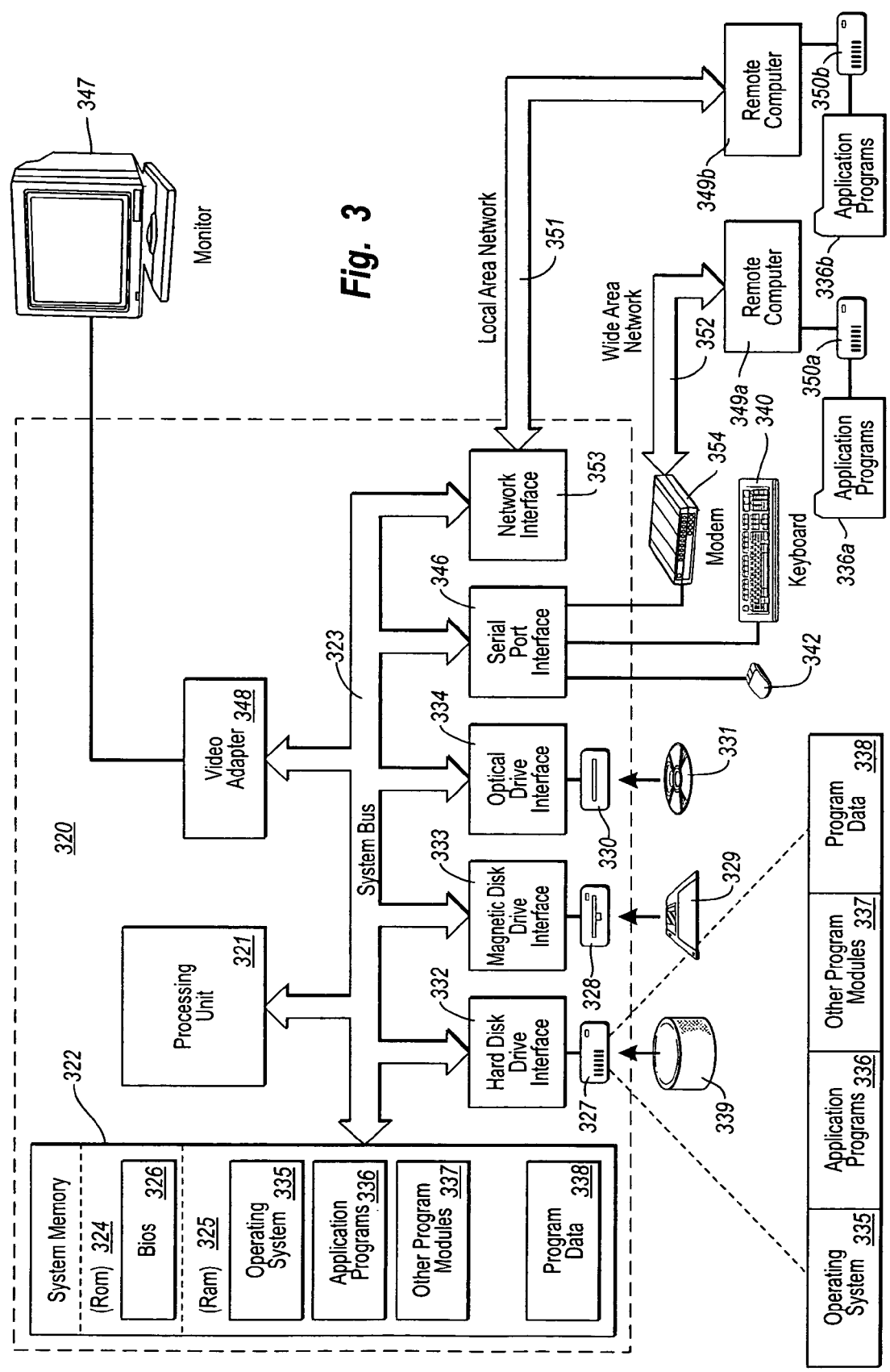
FIG. 3 illustrates an exemplary computing environment for implementing the method of the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention can be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general-purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disc drive 328 for reading from or writing to a removable magnetic disk 329, and an optical disc drive 330 for reading from or writing to removable optical disc 331 such as a CD ROM or other optical media. The magnetic hard disk drive 327, magnetic disk drive 328, and optical disc drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disc 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disc 331, ROM 524 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for obtaining complex data using speech recognition, comprising:
   providing an interactive voice response system configured to receive speech data from a user, the interactive voice response system comprising a database;
   prompting the user for a telephone number;
   receiving and interpreting speech data from the user to generate a speech-obtained telephone number; analyzing the speech-obtained telephone number to determine if the speech-obtained telephone number contains an error and if so, determining if the error can be resolved, wherein if the error can be resolved, the user is prompted by the interactive voice response system to resolve the error;
   accessing a third-party database separate from the interactive voice response system, the third-party database comprising a plurality of stored telephone numbers that each have a stored complex data element associated therewith, wherein the speech-obtained telephone number is compared with the plurality of stored telephone numbers to determine a match;
   for stored telephone numbers that match the speech-obtained telephone number, receiving the complex data element associated with the speech-obtained telephone number from the third-party database using the interactive voice response system;
   conveying the received complex data element to the user using the interactive voice response system and prompting the user to confirm whether the received complex data element is accurate;
   in response to the user confirming that the received complex data element is accurate:
      associating, within the database, the received complex data element with the user; and
      immediately prompting the user for an alternative telephone number if the user does not confirm that the received complex data element is accurate.

2. A method as in claim 1, wherein the third-party database comprises a data base of a credit bureau.

3. A method as in claim 1, wherein the received complex data element comprises a street address.

4. A method as in claim 1, wherein the interactive voice response system receives voice data from the user over a public switched telephone network.

5. A method as in claim 1, wherein the interactive voice response system receives voice data from the user through an internet connection.

6. A method for obtaining complex data using speech recognition by accessing a third-party database, comprising:
   providing an interactive voice response system configured to receive speech data from a user;
   providing access to a third-party database, the third-party database comprising a plurality of stored social security number numerical data elements that each have a stored complex telephone number data element associated therewith;
   prompting the user for only social security number numerical speech data that can be compared with the stored social security number numerical data elements;
   receiving and interpreting the social security number numerical speech data to generate a speech-obtained social security number data element; analyzing the speech-obtained social security number data element to determine if the speech-obtained social security number data element contains an error and if so, determining if the error can be resolved, wherein if the error can be resolved, the user is prompted by the interactive voice response system to resolve the error;
   accessing the third-party database to compare the speech-obtained social security number data element with the plurality of stored social security number numerical data elements to determine a match;
   receiving complex telephone number data associated with any stored social security number numerical data elements that have been matched with the speech-obtained social security number data element;
   conveying the received complex telephone number data to the user using the interactive voice response system and prompting the user to confirm whether the received complex telephone number data is accurate;
   in response to the user confirming that the received complex data element is accurate:
      associating, within a second database, the received complex telephone number data with the user; and
      immediately prompting the user for an alternative social security number numerical speech data if the user does not confirm that the received complex telephone number data is accurate.

7. A method as in claim 6, wherein the third-party database comprises a data base of a credit bureau.

8. A computer program module for use in a system comprising an interactive voice response system configured to receive speech data from a user, the interactive voice response system comprising a database, the computer program module carrying computer executable instructions stored on a storage device of a computing device, the computer executable instructions for implementing a method for obtaining complex data using speech recognition, wherein the method comprises:
   prompting the user for only numerical speech data that can be compared with the stored telephone numbers;
   receiving and interpreting the only numerical speech data to generate a speech-obtained telephone number; analyzing the speech-obtained telephone number to determine if the speech-obtained telephone number contains an error and if so, determining if the error can be resolved, wherein if the error can be resolved, the user is prompted by the interactive voice response system to resolve the error;
   accessing a third party credit bureau database accessible to the user for a fee to compare the speech-obtained telephone number with the plurality of stored telephone numbers to determine a match, wherein the plurality of stored telephone numbers each have a stored complex element associated therewith;
   receiving a complex data element associated with the stored telephone numbers that have been determined to match the speech-obtained telephone number;

conveying the received complex data element to the user and prompting the user to confirm whether the received complex data element should be associated with the user;

in response to the user confirming that the received complex data element should be associated with the user:
associating, within the database, the received complex data element with the user; and
immediately prompting the user for alternative numerical speech data if the user does not confirm that the received complex data element should be associated with the user.

9. A computer program module as in claim 8, wherein the received complex data element comprises a street address.

10. A method is in claim 1, further comprising transferring the user to a human operator if the alternative phone number is not available.

11. A method of claim 6, further comprising transferring the user to a human operator if the alternative social security number numerical speech data is not available.

12. A computer program module as in claim 8, wherein the method implemented by the computer executable instructions of the computer program module further comprises transferring the user to a human operator if the alternative numerical speech data that can be compared with the stored telephone numbers is not available.

13. A method as in claim 1, wherein the error includes the speech-obtained telephone number with only seven numbers and the user is prompted by the interactive voice response system for an area code.

14. A method as in claim 1, wherein the error includes the speech-obtained telephone number with an invalid area code.

15. A method as in claim 6, further comprising immediately prompting the user for an alternative social security number numerical speech data if there is no match between the speech-obtained social security number data element and plurality of stored social security number numerical data elements in the third party database.

* * * * *